United States Patent [19]
Halbeck

[11] 4,002,951
[45] Jan. 11, 1977

[54] ELECTRICAL RECEPTACLE MOUNTED GROUND FAULT INTERRUPTER WITH AUTOMATIC INSERTION TESTING

[75] Inventor: Werner B. Halbeck, Mequon, Wis.
[73] Assignee: Cutler-Hammer, Inc., Milwaukee, Wis.
[22] Filed: Sept. 22, 1975
[21] Appl. No.: 615,698
[52] U.S. Cl. .......................... 317/18 D; 340/253 H
[51] Int. Cl.² .................................... H02H 3/26
[58] Field of Search ................ 317/18 D; 324/51; 340/248 E, 253 N, 253 H, 255

[56] References Cited
UNITED STATES PATENTS

| | | | |
|---|---|---|---|
| 3,441,799 | 4/1969 | Delafrange et al. | 317/9 |
| 3,813,579 | 5/1974 | Doyle et al. | 317/18 D |
| 3,931,601 | 1/1976 | Anderson | 317/18 D X |

*Primary Examiner*—Harry Moose
*Attorney, Agent, or Firm*—Hugh R. Rather; William A. Autio; Michael E. Taken

[57] ABSTRACT

Electric receptacle apparatus having a ground fault detector and current interrupter. The apparatus may be mounted in the standard receptacle box used for housing a double socket outlet. The apparatus includes means for automatically testing the operation of the system upon connector plug insertion and means for providing a visual indication of the occurrence of a ground fault.

10 Claims, 15 Drawing Figures

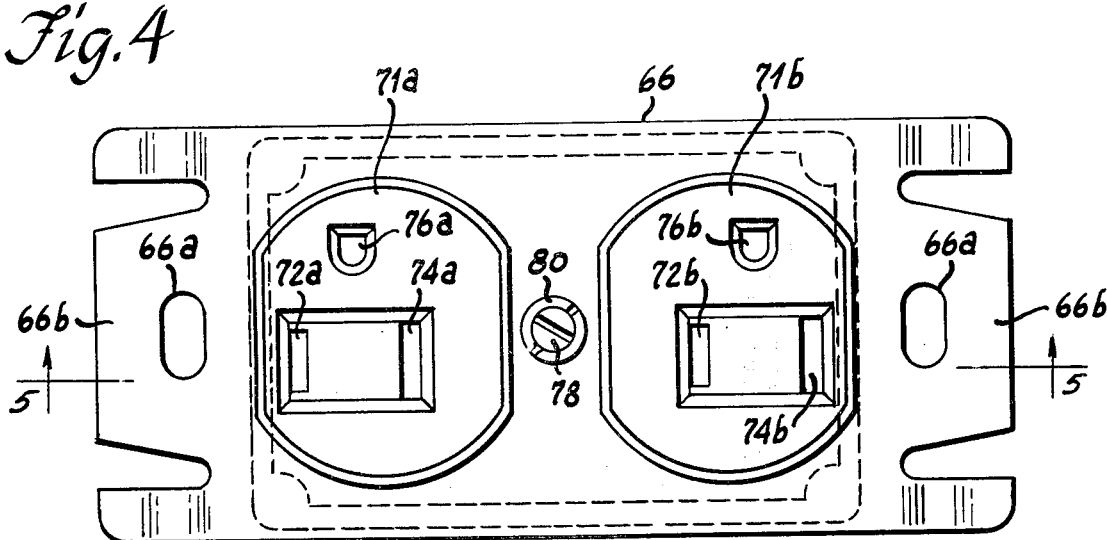
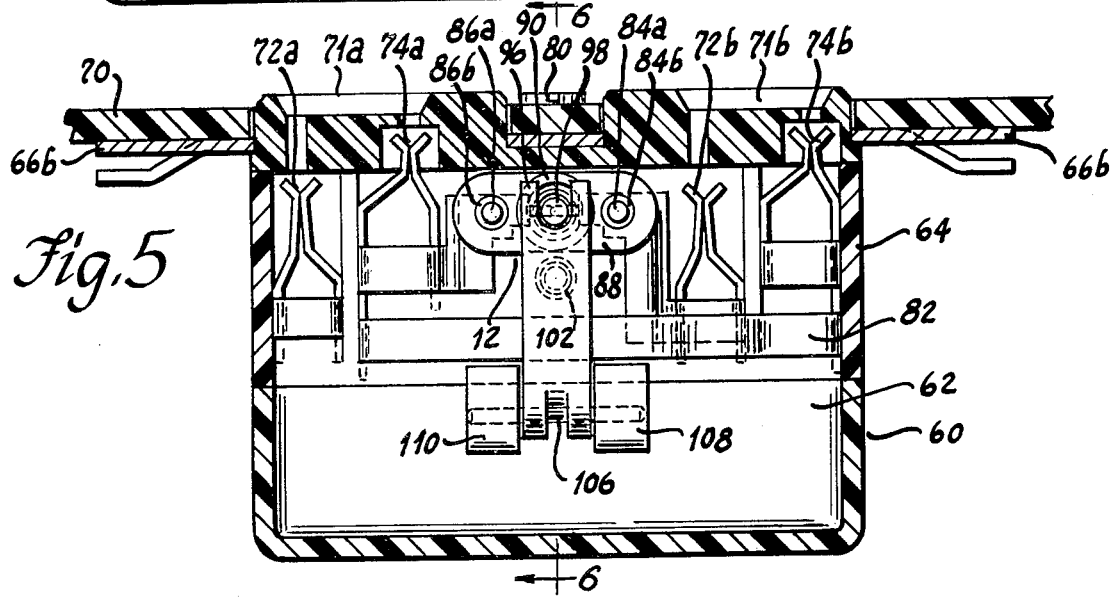
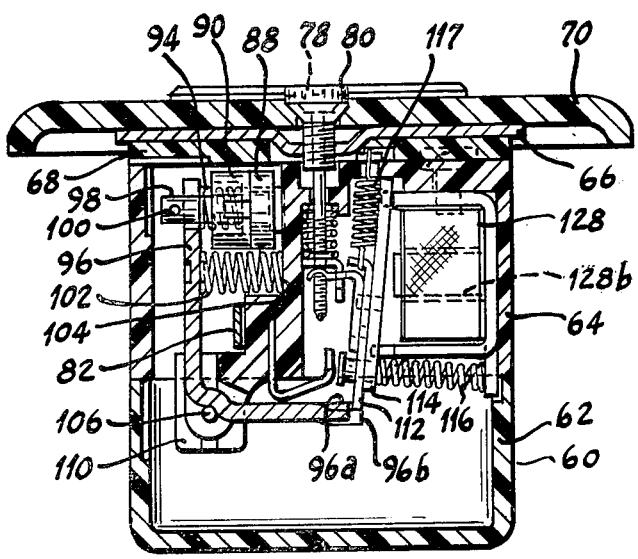

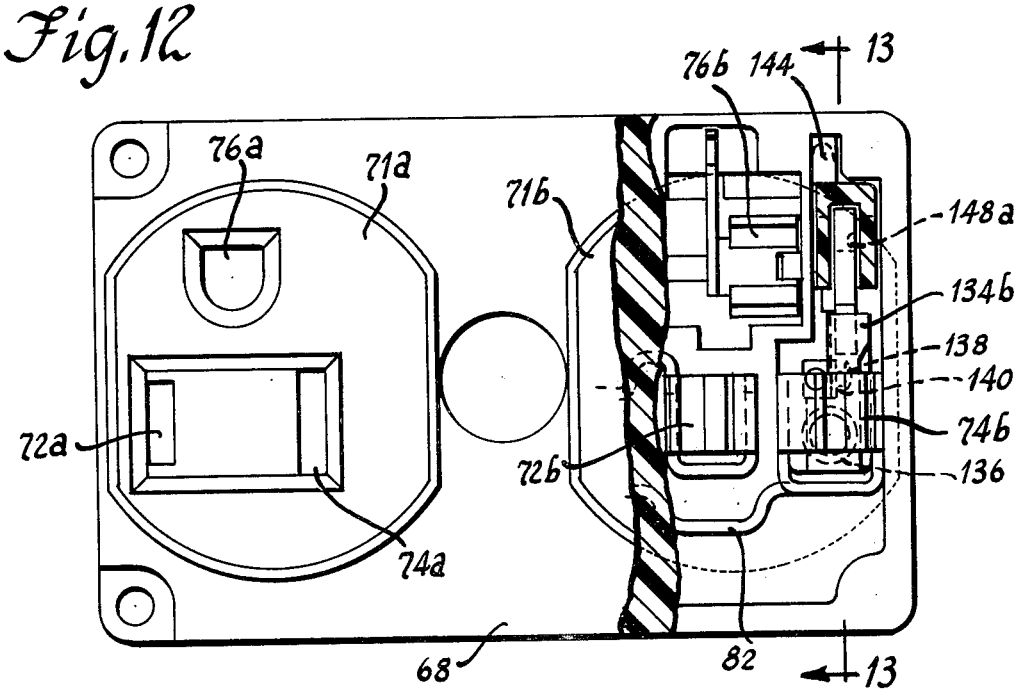
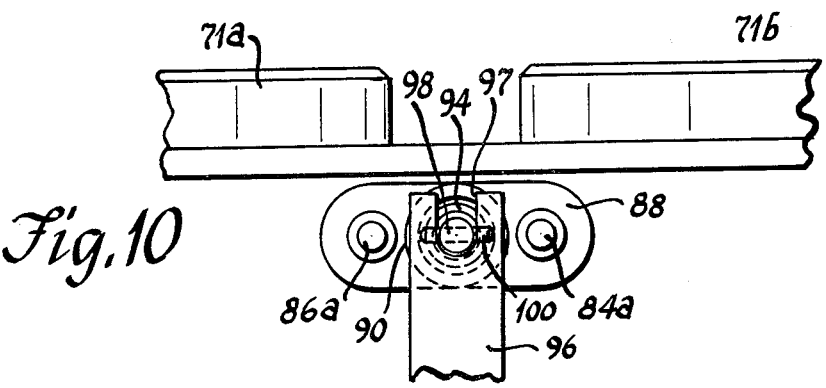
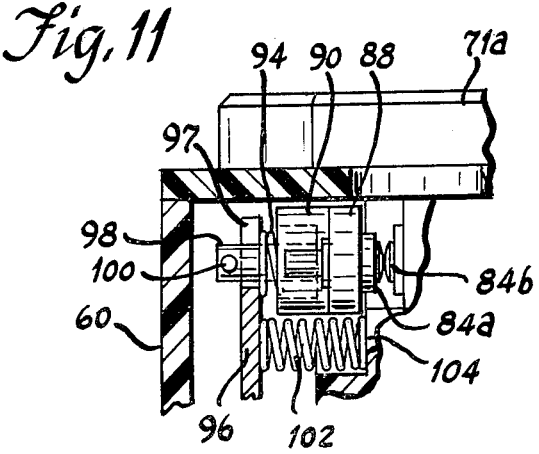

ELECTRICAL RECEPTACLE MOUNTED GROUND FAULT INTERRUPTER WITH AUTOMATIC INSERTION TESTING

BACKGROUND OF THE INVENTION

This invention relates generally to electrical power systems and to equipment for protection against electrical shock. More particularly, the invention pertains to a standard size electrical outlet incorporating a ground fault protector therein.

Standard size electrical receptacle boxes containing a ground fault protective device are known in the prior art. These devices provide for current interruption when there exists a ground fault current on the order of 5 milliamperes or more. A ground fault current is that current which flows from a conductor in the distribution circuit to ground through a person or property, thereby causing bodily injury or property damage, respectively.

Ground fault interrupters typically monitor the flow of current in the conductors of the distribution system and provide a responsive signal causing interruption thereof when the current flowing through a conductor to a load is not equal to the current flowing through a conductor back to the source.

However, these prior receptacle boxes have been subject to one or more disadvantages such as manual testing of the operation of the ground fault protector, thereby requiring conscientious testing by the user to assure reliable operativeness, and non-standard coverplates requiring special design.

While these prior receptacles have been useful for their intended purpose, this invention relates to improvements thereover.

SUMMARY OF THE INVENTION

This invention relates to electrical receptacle boxes incorporating a ground fault interrupter.

An object of the invention is to provide an improved receptacle with ground fault protection.

A more specific object of the invention is to provide a receptacle with ground fault protection which can be mounted in a standard size double socket wall outlet box.

Another specific object of the invention is to provide a receptacle of the above character to which standard design cover plates may be mounted.

Another object of the invention is to provide a compact means for automatically testing the operation of a system of the above character upon each connector plug insertion.

Other objects and advantages of the invention will hereinafter appear.

BRIEF DESCRIPTION OF THE DRAWINGS

FIG. 4 is a top view taken along line 4—4 of FIG. 3.

FIG. 5 is a cross-sectional view taken along line 5—5 of FIG. 4.

FIG. 6 is a cross-sectional view taken along line 6—6 of FIG. 5 and illustrates the normal operating position of the device shown therein.

FIG. 10 is a fragmentary view to enlarged scale of a portion of the device as shown in FIG. 5.

FIG. 11 is a fragmentary view to enlarged scale of a portion of the device as shown in FIGS. 6–9.

FIG. 12 is a top view with a part thereof fragmentarily cut away to expose one of the two sets of automatic testing means of the present invention.

DESCRIPTION OF THE PREFERRED EMBODIMENT

Figure 1:
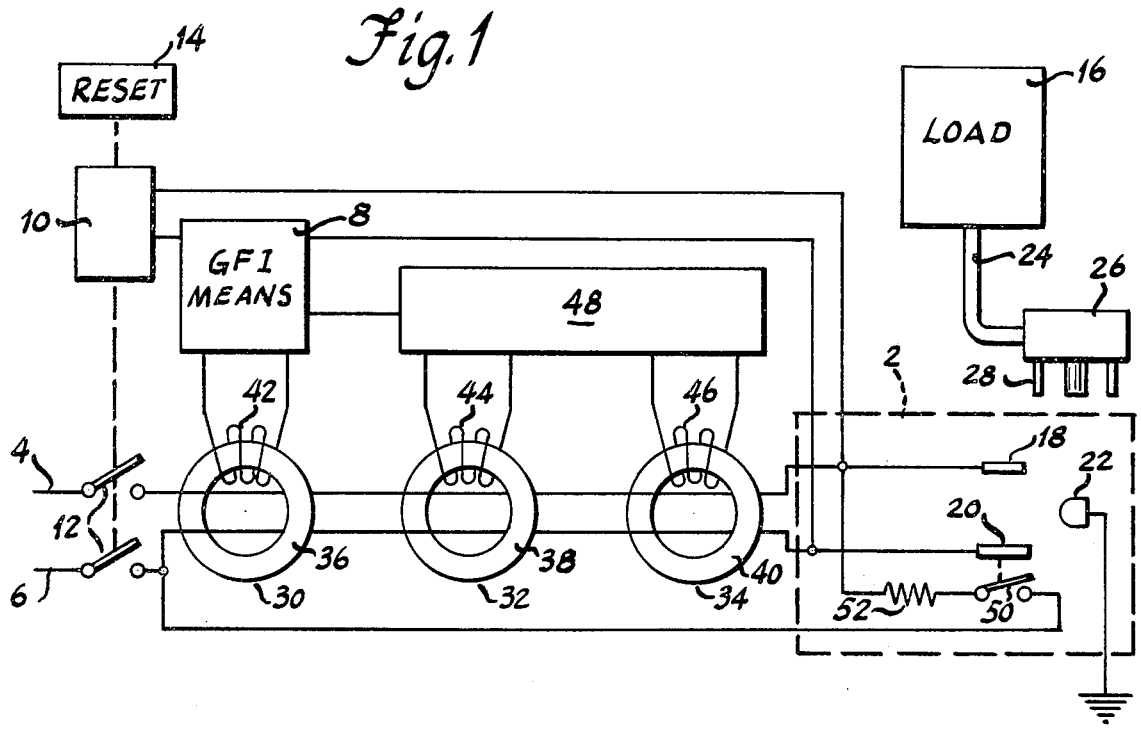
FIG. 1 schematically depicts a ground fault protective system incorporating the present invention.

As schematically illustrated in FIG. 1, the receptacle apparatus of the present invention includes socket means 2 connected to the line conductor 4 and neutral conductor 6. A ground fault detector means 8 responds to a ground fault, i.e. an imbalance in the current between the line and neutral conductors 4 and 6, by triggering the current interrupter means 10 which operates to open the switch 12, thereby cutting off current flow to the socket means 2. Reset means 14 is provided for closing the contacts 12 after a ground fault has been corrected.

The socket means 2 provides current conduction to a load 16, such as an appliance. This socket means has a line terminal 18 for connection to the line conductor 4, a neutral terminal 20 for connection to the neutral conductor 6, and a ground terminal 22 connected to ground. The load 16 is connected to a service cord 24 which is connected to a plug 26 having a plurality of conductive connector prongs 28 engaged by the appropriately adapted terminals 18, 20 and 22 of socket means 2.

The ground fault detecting means 8 in one preferred form is like that disclosed in application Ser. No. 345,731, filed Mar. 28, 1973, and assigned to the assignee of this invention. It includes three differential transformers 30, 32 and 34, having toroidal cores 36, 38 and 40, single turn primary windings 4 and 6, and secondary windings 42, 44 and 46 consisting of a plurality of turns wound on the cores. An input means 48 provides input to the ground fault detector means 8 from the secondary windings 44 and 46 of coils 32 and 34.

Under normal operating conditions, the current in the line and neutral conductors 4 and 6, which are also the primary windings, are balanced, resulting in a zero net flux in the cores 36, 38 and 40, and a zero output voltage across the secondary windings 42, 44 and 46.

When a ground fault occurs, the currents in the primary windings 4 and 6 are not equal, causing a nonzero net magnetic flux in the cores 36, 38 and 40, thereby inducing a fault signal in the secondary windings 42, 44 and 46. This fault signal is applied to the ground fault detector means 8 which in turn will trigger the current interrupter means 10 to open the switch 12.

The socket means 2 is provided with contact means 50 for automatically testing the operation of the ground fault protector system. During insertion of plug 26 into the socket means 2, the contacts 50 will momentarily close, and will reopen when said plug is fully inserted, as will be described in detail hereinafter. Upon said momentary closure of contacts 50, a simulated ground fault is introduced between the line and neutral conductors 4 and 6 because of the resistance 52 through which current flows back to neutral, by-passing the coils. This ground fault will cause the ground fault detector means 8 to trigger the current interrupter means 10. Current flow is restored by manual operation of the reset means 14.

Figure 2:
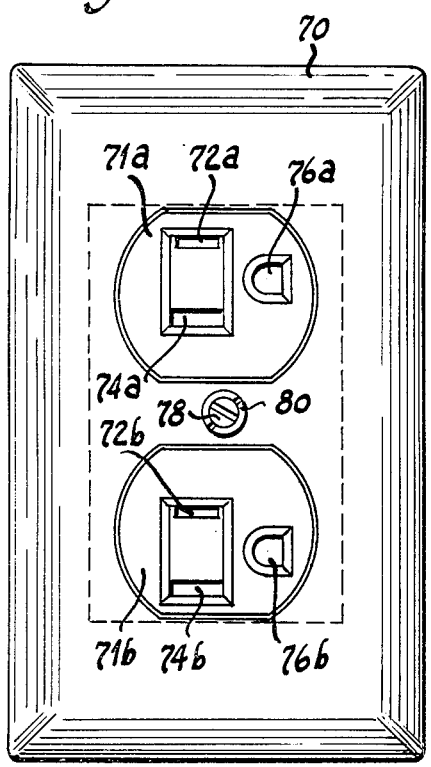
FIG. 2 is a front elevational view of one embodiment of an electric receptacle apparatus with ground fault protection incorporating the present invention.
Figure 3:
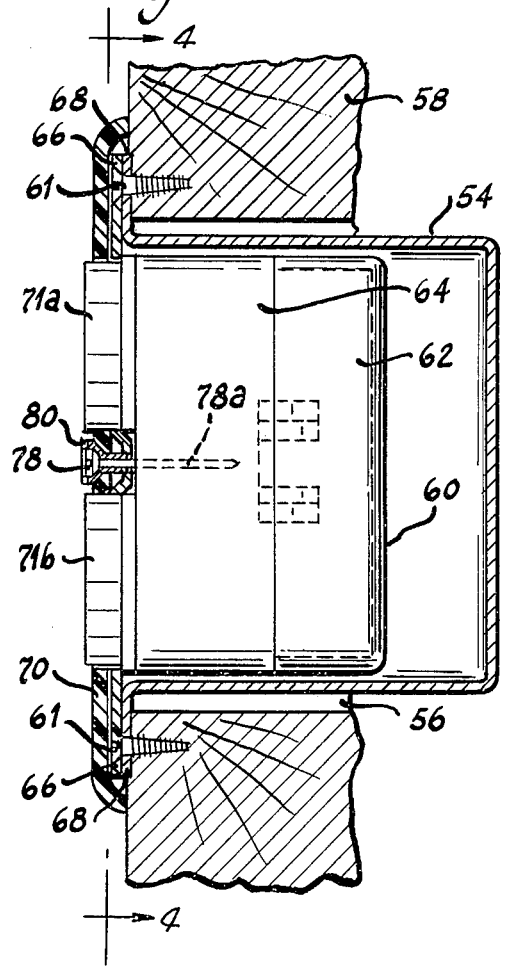
FIG. 3 is a view in side elevation, partially in cross-section, of the device illustrated in FIG. 2.

As illustrated in FIGS. 2–4, the receptacle apparatus may be housed in a standard size receptacle box 54 of the double outlet type. Such boxes are typically about 4 inches long, 2 inches wide and 2 inches deep. Box 54 is mounted in the recessed area 56 of a building wall 58. A generally rectangular housing 60 is seated within the box 54. The ground fault detecting means 8, input means 48, and transformers 30–34, are mounted within the lower portion 62 of the housing and the remaining components of the receptacle are mounted within the upper portion 64 of the housing.

A mounting plate 66 is attached to flange portions 68 of box 54 by screws 61 extending through apertures 66a in tong portions 66b of mounting plate 66, thereby covering the open top end of said box. A cover or escutcheon plate 70 is mounted through its center aperture to mounting plate 66 and housing 60 by a mounting screw 80, said cover plate engaging the outer surface of the wall over the recessed area, thereby enclosing box 54.

Cover plate 70 and mounting plate 66 have openings in socket mountings 71a and 71b for receiving plug 26 prong connections to line terminals 72a and 72b, neutral terminals 74a and 74b, and ground terminals 76a and 76b.

A reset and ground fault indicator button stem 78 is situate slidably within and extends axially through mounting screw 80. Hence, cover plate 70 may be of standard design with no adaptation necessary from the type in common use today.

As illustrated in FIG. 5, the neutral terminals are connected by a conductor 82. The line terminals are also connected by a conductor, not shown.

The switch contacts 12 are located near the top of housing 60 between sockets 71a and 71b. Referring to FIGS. 5, 10 and 11, two sets of separate and electrically isolated contacts are provided; one set 84a and 84b for interrupting the flow of current in the line conductor and the other set 86a and 86b for interrupting the flow of current in the neutral conductor. These sets of contacts include fixed contacts 84b and 86b engageable by movable contacts 84a and 86a respectively. Said movable contacts are mounted on a flat rigid insulating member 88 and hence move in unison and in a direction perpendicular to the direction of plug insertion and perpendicular to the longidudinal axis of said cover plate. Movable contact 84a is connected to the line side of the power source and stationary contact 84b is connected to the line terminal 72b. Movable contact 86a is connected to the neutral side of the power source and stationary contact 86b is connected to the neutral terminal 74a.

The current interrupter and reset means and the sequential operation thereof are best illustrated in FIGS. 6–9. Insulating member 88 is attached to a sleeve member 90. A helical compression spring 94 is positioned within and extends beyond said sleeve for engagement by a generally L-shaped actuator bar 96. This actuator bar is provided with an open-ended U-shaped slot 97 at the top, as best shown in FIGS. 5 and 10, which is smaller in width than the diameter of said helical compression spring. A dowel rod 98, which freely rests in and is guided by said U-shaped slot and extends through said helical compression spring, is integrally attached to insulating member 88 on one side of said actuator bar, and is provided with a peg 100 transversing and longer than the width of said U-shaped slot on the other side of said actuator bar. This transverse dowel rod is offset from the actuator bar in normal operating position and hence acts as a lost motion driving mechanism upon movement of said actuator bar, as will be more fully described hereinafter. Another helical compression spring 102 is positioned below said sleeve member with one end retained in a recess in an inner vertical wall 104 of the housing 60 and the other end bearing against said actuator bar.

The actuator bar 96 is rockable about a rotatable pivot rod 106 positioned in a shallow groove formed in the outer L-junction of said actuator bar. Support members 108 and 110 are provided for mounting said pivot rod. On the end of the horizontal arm of actuator bar 96, there is provided an arm portion 96a which forms a nub or a stop because of the extension therebeyond of a lower offset arm portion 96b.

The lower arm portion 96b is engageable by the lower end of a slidable lock member 112 which is slidably mounted on an armature 114. The armature 114 is hinged at its top to the housing 60 and is biased into engagement with lock member 112 by a helical compression spring 116. Another helical compression spring 117 biases lock member 112 in a generally upward direction. A generally L-shaped transition member 118 has a straight arm 118a fixed on said lock member, and has an arm 118b with a shallow C-shaped portion at the end thereof. Armature 114 is provided with a boss 120 arranged for slidable enclosure by an elongated slot in lock member 112 and transition member 118, thereby acting as a guide during sliding motion by said lock member and said transition member. The armature is also provided with another boss 122, shorter than boss 120, and arranged for locking enclosure by a slot in lock member 112, thereby latching said lock member when it is in its down position engaging lower arm portion 96b of actuator bar 96. The armature is also provided with a flanged stud 124 fixed thereto at its lower end extending freely through an elongated aperture in lock member 112, the width of said elongated aperture being smaller than the diameter of the flanged portion of said stud.

A stop 126 is provided to limit the range of motion of the stud and hence of armature 114, lock member 112, and transition member 118. The armature is also provided with a stop 127 which limits the upward movement of the lock member. Stop 126 also limits the range of pivotal motion of actuator bar 96.

A solenoid 128 is mounted in the upper portion 64 of housing 60. This solenoid includes a trip coil 128a which is adapted for connection to the ground fault detector means by conductors, not shown, and it also includes a core member 128b positioned to attract armature 114 upon energization of the coils of the solenoid in response to a ground fault signal from said detector means. The supporting framework can serve as part of the magnetic circuit for operating the solenoid and is preferably of a good magnetic material such as mild steel.

Reset button 78 extends freely and axially through mounting screw 80. A helical compression spring 130 is disposed about the stem 78a of button 78 and is vertically seated between a horizontal partition on the housing 60 and an L-shaped plate member 132. Plate 132 has a circular bore in its horizontal arm for threadingly receiving the stem 78a of button 78. The vertical arm of L-shaped plate 132 is provided with a clearance opening for freely receiving the horizontal arm 118b of transition member 118, thereby allowing the outershallow C-shaped portion at the end of last recited arm to tangentially engage the underside of said horizontal arm of plate 132.

Figure 7:
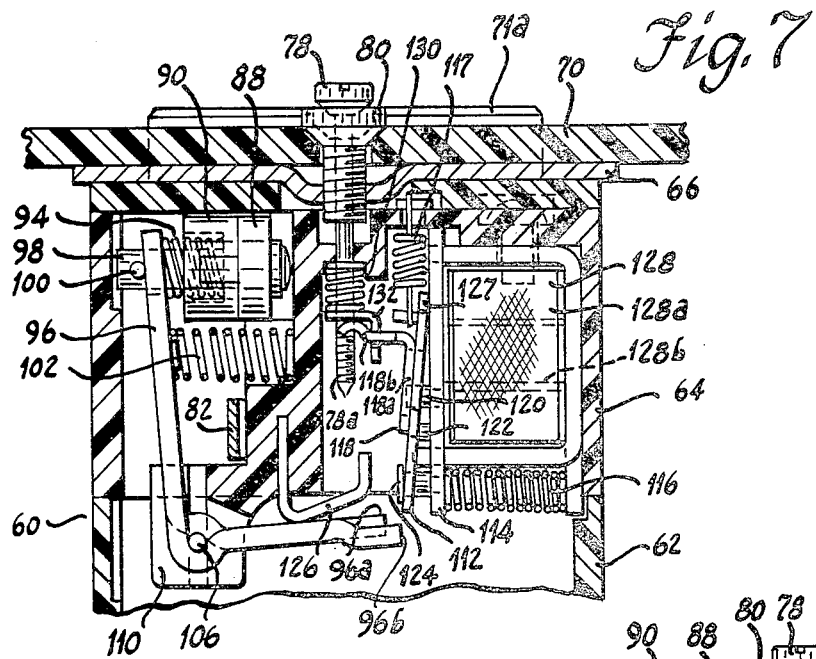
FIG. 7 is a view similar to FIG. 6 and illustrates the device in its "tripped" position with the coil momentarily energized and the contacts open.

Sequential operation of the current interrupter means and reset means can now be more fully described. FIG. 6 illustrates the above-described system in its normal operating position. Upon the occurrence of a ground fault, the ground fault detector means will energize the coil 128a of solenoid 128. As illustrated in FIG. 7, armature 114 will pivot about its hinge point due to the attractive force produced by the energized coil of solenoid 128. Upon pivoting toward the solenoid, the armature pivots away from lock member 112 and boss 122 is removed from its locking enclosure in said lock member, thereby allowing said lock member to move upward under the bias of spring 117 until it reaches stop 127, being guided therealong by boss 120 and stud 124. Transition member 118 is also moved upward, thereby raising reset button 78 above the level of cover plate 70 and hence giving a visual indication of a ground fault.

Upward movement of the lock member releases actuator bar 96 and allows it to rock under the bias of spring 102 to strike a hammer blow on peg 100 thereby moving dowel rod 98 to the left to open contacts 84a, 84b and 86a, 86b. Even if the ground fault is only momentary, as is the case in the automatic test feature of this invention, and which will be more fully described hereinafter, the contacts will remain open until the reset button is depressed.

Figure 8:
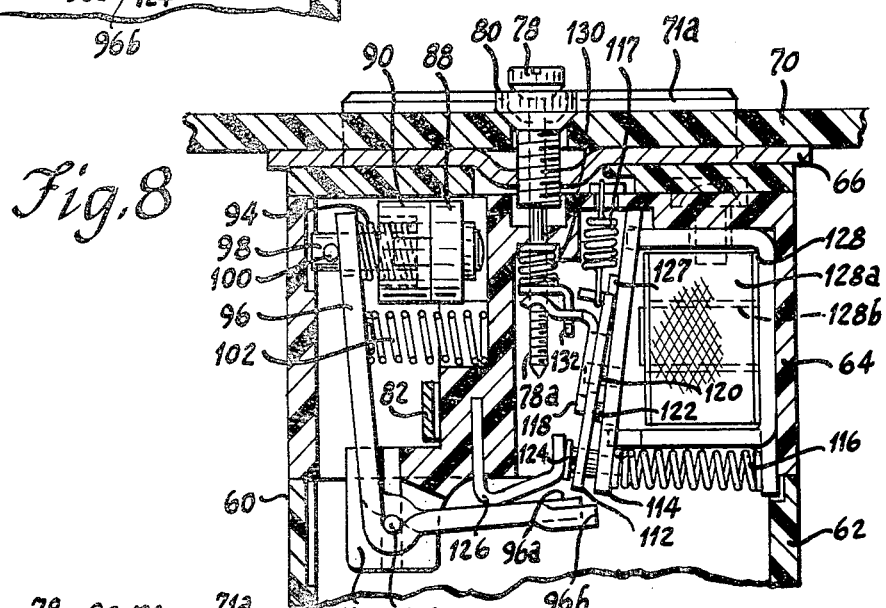
FIG. 8 is a view like FIGS. 6 and 7 and illustrates the next sequential mode thereto, wherein the coil is deenergized and the contacts remain open.

As illustrated in FIG. 8, upon deenergization of the coil of the solenoid, armature 114 swings back to the left under the bias of spring 116 until stud 124 reaches stop 126. However, because lock member 112 is in its upward position, boss 122 will not be then aligned with its counterpart locking enclosure slot in lock member 112, and hence said lock member merely swings to the left and remains in its upward position, thereby not engaging actuator bar 96. Hence the contacts 84a, 84b and 86a, 86b remain open.

Figure 9:
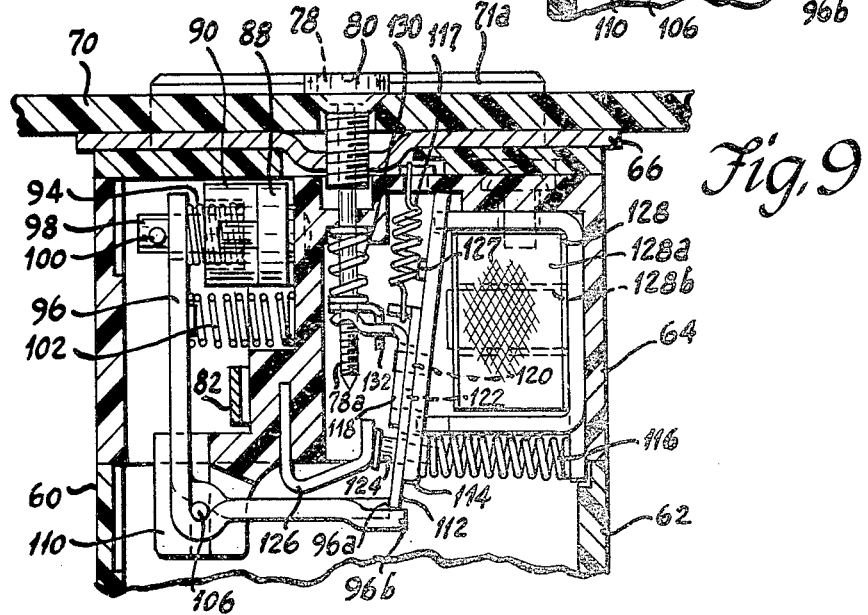
FIG. 9 is a view like FIGS. 6, 7 and 8 and illustrates the reset and contacts closed position of the device.

As illustrated in FIG. 9, depression of reset button 78 causes downward movement of plate 132, transition member 118, and lock member 112. During this downward movement, the lock member will engage lower extension portion 96b of actuator bar 96, thereby closing contacts 84a, 84b and 86a, 86b under the bias of spring 94. The reset button will remain depressed and the contacts will remain closed because during the downward movement of lock member 112, boss 122 and its counterpart locking enclosure slot became aligned and spring 116 caused reinsertion of the boss into said slot.

It is important to note the trip-free feature of the present invention wherein the contacts cannot be reclosed if a ground fault persists. This is so because armature 114 will remain pivoted to the right as long as the coil of the solenoid is energized, and, as seen in FIG. 7, even if the reset button is depressed, lock member 112 will not engage lower arm portion 96b.

Figure 13:
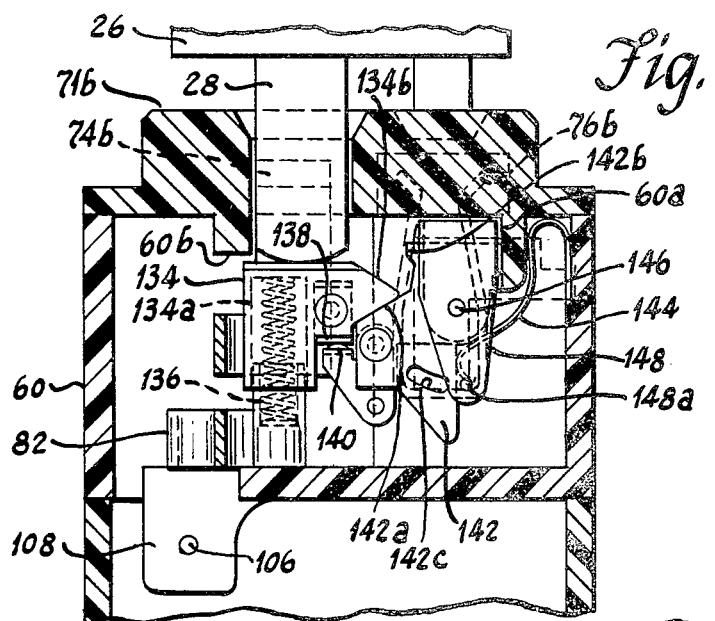
FIG. 13 is a cross-sectional view taken along line 13—13 of FIG. 12 and illustrates the position of the device shown therein upon partial connector plug insertion.

Each socket is provided with automatic testing means one of which is illustrated in FIGS. 12 through 15. As illustrated in FIG. 13, a plunger 134 is arranged for vertical motion upon engagement by plug prong 28 during insertion of said connector plug 26. A circular bore 134a extending upwardly into plunger 134 forms a cylindrical cavity therein and partially houses a helical compression spring 136 for biasing the plunger upwardly against the direction of plug prong insertion. The housing is provided with a stop 60b for halting the upward movement of the plunger. The circular bore, the helical compression spring, and the direction of plug prong insertion are all co-axial. The plunger is further provided with a camming projection 134b extending transversely to the axis of said cylindrical bore.

A contact 138 is attached to plunger 134 between that part of the plunger housing the helical compression spring 136 and the camming projection 134b. Another contact 140 is arranged for momentary engagement by contact 138 upon plug prong depression of plunger 134. Contacts 138 and 140, corresponding to contact means 50, FIG. 1, are connected by conductors by-passing coils 30, 32 and 34 to introduce a simulated ground fault upon closure, thereby triggering the ground fault detector causing the contacts 84a, 84b and 86a, 86b to open, as above described.

Contact 140 is rigidly attached to a swing member 142 biased in a clockwise direction, as shown in FIG. 13, by leaf spring 144 against stop 60a. Swing member 142 is arranged for pivotal motion about point 146 and pivots upon engagement of its inclined camming surface 142a by camming projection 134b. The swing member is also provided with a return camming tip 142b formed for engagement by camming projection 134b during its upward movement upon plug withdrawal. Swing member 142 is also provided with an arcuate recess 142c along an arc about point 146, said recess having a semi-circular cross-sectional shape.

A generally U-shaped rigid sheet member 148 is attached to the housing 60 and is retained in a fixed position in the plane of pivoting swing member 142, though slightly flexible in a plane perpendicular thereto. A semi-spherical protrusion 148a, having the same radial distance from point 146 as does arcuate recess 142c, is formed in said sheet member and is arranged for capturing engagement with said recess upon pivoting of swing member 142.

Figure 14:
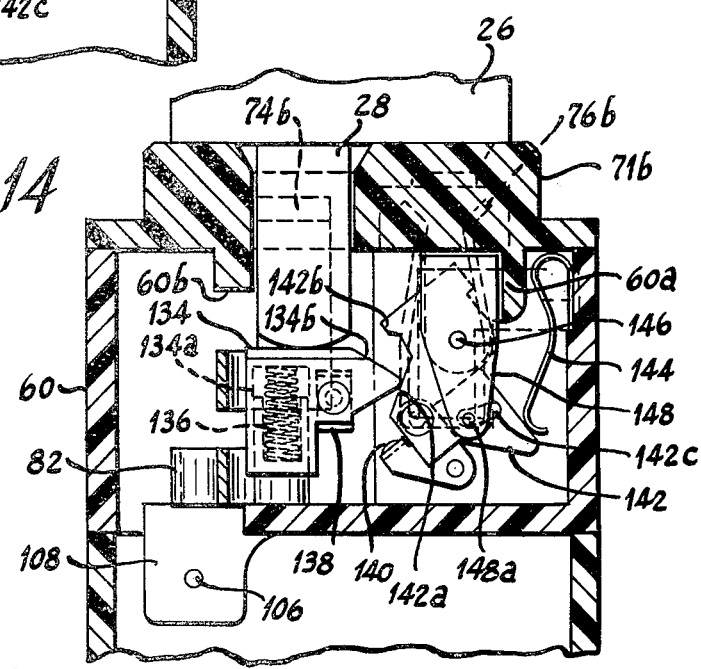
FIG. 14 is a view similar to FIG. 13 and illustrates the position of the device shown therein upon full connector plug insertion.

Sequential operation of the automatic testing means can now be more fully described. As illustrated in FIG. 13, upon plug insertion, plug prong 28 engages plunger 134, causing it to move vertically downward thereby closing the contacts 138 and 140, and hence introducing a simulated ground fault. Further insertion of the plug causes camming projection 134b to engage camming surface 142a, thereby causing swing member 142 to pivot counterclockwise, thereby opening the contacts 138 and 140. FIG. 14 shows the position of the testing means when the plug is fully inserted. During plug insertion, the closure of contacts 138 and 140, and hence the simulated ground fault, is momentary. Also, when the plug is fully inserted, protrusion 148a is captured by recess 142c.

Figure 15:
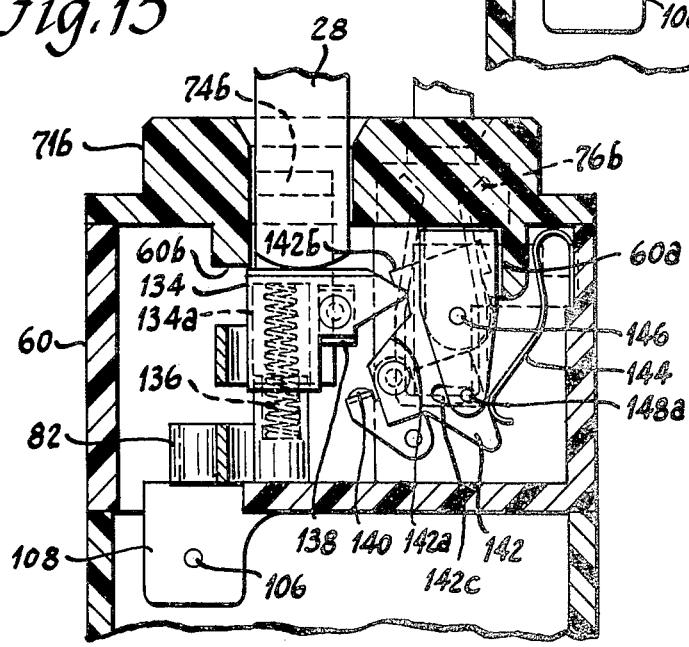
FIG. 15 is a view similar to FIG. 14 and illustrates the position of the device shown therein upon partial connector plug withdrawal.

As illustrated in FIG. 15, upon plug withdrawal, plunger 134 will move vertically upward due to the bias of spring 136, and swing member 142 will pivot clockwise due to the bias of spring 144. During said pivoting motion, arcuate recess 142c, because of its arc-length elongation, slides encapturingly around and along stationary protrusion 148a. When the right edge of said recess engages said protrusion, swing member 142 will stop its clockwise motion because spring 144 is not strong enough to overcome the capturing engagement of said recess by said protrusion. The motion of said swing member is arrested before the closure of contacts 138 and 140, thereby preventing simulated ground fault introduction upon plug withdrawal.

As illustrated in FIG. 15, after the motion of said swing member is stopped, plunger 134 continues upwardly under the bias of spring 136 and during this upward movement, camming projection 134b strikes camming tip 142b freeing said recess from said protrusion due to the combined effect of the strength of spring 136 and the hammer-blow exerted by said camming projection. Swing member 142 then continues its clockwise motion to its normal position under the bias of spring 144 without reclosure of the contacts 138 and 140.

I claim:

1. In an electrical receptacle apparatus for mounting in a wall outlet box or the like, the combination comprising:
    socket means having terminals for receiving complementally formed prongs of an electrical connector plug;
    switch means for connecting terminals of said socket means to line and neutral sides of an A.C. power source and including movable contact means for completing and interrupting current between said terminals and the respective sides of said power source;
    a member for releasably holding said contact means in circuit completing position;
    means normally biasing said member and said contact means to move to circuit interrupting positions;
    releaseable latch means normally holding said member and contact means in circuit completing positions;
    electroresponsive means energizable to trip said latch means to release said member and effect circuit interrupting opening of said contact means by said biasing means;
    ground fault sensing means for monitoring the flow of current through the terminals of said socket means and responsive to ground faults occuring in circuit branches connected with such terminals to energize said electro-responsive means; and
    means including a member adjacent a terminal opening in said socket means and responding to a predetermined depth of insertion of a prong of a connector plug in said socket means to cause said sensing means to momentarily respond to a simulated ground fault for testing the operability of said ground fault sensing means and the other means responsive thereto each time a connector plug is inserted in said socket means.

2. The combination according to claim 1 wherein said receptacle apparatus further comprises:
    a housing;
    an escutcheon plate overlying the outer surface of said housing and having clearance openings for said socket means;
    a screw for securing said escutcheon plate to said housing and having an axial bore extending therethrough;
    a reciprocably movable member situate within said housing and the bore of said screw and extendable beyond the outer end of said screw; and
    means responsive to release of said latch means to move the last mentioned member a predetermined distance beyond the outer end of said screw to provide indication of ground fault tripping action, said last recited member being movable from its last mentioned position inwardly of said housing to reset the first mentioned member and said latch means and effect reclosure of said switch means.

3. The combination according to claim 2 wherein portions of said socket means are so configured and said housing has a threaded opening so located that said escutcheon plate can be of the standard commercially available type having a single centrally located mounting screw receiving opening.

4. The combination according to claim 1 wherein the specified member of said means which responds to a predetermined depth of insertion of a connector plug is a reciprocably movable member, and wherein the last recited means further comprises:
    means normally biasing said reciprocably movable member in a direction opposite to plug prong insertion;
    a pivotally mounted member;
    means normally biasing said pivotally mounted member to a position in the path of said reciprocably movable member; and
    switch contact means carried by said reciprocably movable and pivotally mounted members which are closable momentarily when said reciprocably movable member is engaged by a plug prong and moved a given distance against its biasing means.

5. The combination according to claim 4 wherein said pivotally mounted member, following the momentary closure of said switch contacts, is pivoted by said reciprocably movable member to reopen said switch contacts.

6. The combination according to claim 5 together with means acting upon plug prong withdrawal to prevent reclosure of said switch contacts by delaying the movement of said pivotally mounted member by its biasing means in relation to that of said reciprocably movable member by its biasing means.

7. The combination according to claim 6 wherein said delaying means comprises detent means which are set to hold said pivotally mounted member in its pivoted position pending movement of said reciprocably movable member a predetermined distance towards its normal biased position and reengagement by the latter with said pivotally mounted member to effect release of said detent means.

8. The combination according to claim 1 wherein said electroresponsive means has an armature and wherein said latch means comprises:
    a latch member mounted on said armature;

detent means normally holding said latch member in a fixed position on said armature when said electroresponsive means is deenergized to latch the first mentioned member and said contact means in their circuit completing positions;

means responsive to closing movement of said armature whenever said electroresponsive means is energized to disengage said detent means;

means biasing said latch member for sliding movement on said armature whenever said detent means is disengaged to release said first mentioned member to effect circuit interrupting opening of said contact means; and reset means operable to slide said latch member on said armature against its biasing means to reengage said detent means following deenergization of said electroresponsive means.

9. The combination according to claim 8 wherein said reset means comprises:

a reciprocably movable member extendable beyond said wall outlet box; and means translating the movement of said latch member upon disengagement of said detent means to said reciprocably movable member to move said member a predetermined distance beyond said wall outlet box to provide indication of ground fault tripping action, and translating the movement of said reciprocably movable member upon manual depression thereof to said latch member to return said member to its detent engagement position thereby relatching the first mentioned member and said contact means in their circuit completing positions following deenergization of said electroresponsive means.

10. The combination according to claim 9 wherein said receptacle apparatus further comprises:

a housing;

a standard type escutcheon plate overlying the outer surface of said housing and having clearance openings for said socket means and a single centrally located mounting screw receiving opening; and a mounting screw having an axial bore extending therethrough for receiving said reciprocably movable member.

* * * * *